(12) United States Patent
Yasuda et al.

(10) Patent No.: US 8,717,420 B2
(45) Date of Patent: May 6, 2014

(54) HEAD MOUNTED IMAGE-SENSING DISPLAY DEVICE AND COMPOSITE IMAGE GENERATING APPARATUS

(75) Inventors: Toshiyuki Yasuda, Kawasaki (JP); Toshiyuki Okuma, Chofu (JP); Yoshihiro Saito, Hachioji (JP); Toshiki Ishino, Hiratsuka (JP); Takaaki Nakabayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 622 days.

(21) Appl. No.: 12/523,563

(22) PCT Filed: Mar. 7, 2008

(86) PCT No.: PCT/JP2008/054681
§ 371 (c)(1),
(2), (4) Date: Jul. 17, 2009

(87) PCT Pub. No.: WO2008/114704
PCT Pub. Date: Sep. 25, 2008

(65) Prior Publication Data
US 2010/0026787 A1     Feb. 4, 2010

(30) Foreign Application Priority Data
Mar. 12, 2007  (JP) ................................ 2007-062481

(51) Int. Cl.
| | |
|---|---|
| *G09G 5/00* | (2006.01) |
| *G06T 15/20* | (2011.01) |
| *G06T 1/20* | (2006.01) |
| *H04N 5/14* | (2006.01) |
| *H04N 13/02* | (2006.01) |
| *H04N 13/04* | (2006.01) |
| *H04N 5/262* | (2006.01) |
| *G02B 27/22* | (2006.01) |
| *G02B 27/14* | (2006.01) |
| *G02B 7/182* | (2006.01) |
| *G06K 9/00* | (2006.01) |

(52) U.S. Cl.
USPC ............... 348/47; 345/8; 345/427; 345/506; 345/632; 348/26; 348/46; 348/53; 348/239; 359/464; 359/631; 359/846; 382/154

(58) Field of Classification Search
None
See application file for complete search history.

(56) References Cited

U.S. PATENT DOCUMENTS 5,978,015 A * 11/1999 Ishibashi et al. ................. 348/47
6,507,359 B1    1/2003 Muramoto et al.
(Continued)

FOREIGN PATENT DOCUMENTS

| EP | 0 644 701 A2 | 3/1995 |
|---|---|---|
| JP | 7-87385 A | 3/1995 |

(Continued)

OTHER PUBLICATIONS

Kobayashi, Image Processing Method, Image Processor, Oct. 19, 2006, english translation of JP 2006-285609.*

(Continued)

*Primary Examiner* — Moustafa M Meky
*Assistant Examiner* — Ho Shiu
(74) *Attorney, Agent, or Firm* — Fitzpatrick, Cella, Harper & Scinto

(57) ABSTRACT

The invention provides a head mounted image-sensing display device including a pair of image-sensing units (18R, 18L) that stereoscopically capture a physical space and output a pair of stereoscopic images, and display units (13R, 13L) for displaying images for the right eye and images for the left eye. Image sensing parameters that are previously measured for the image-sensing units are stored in image sensing parameter storage units (26R, 26L). As a result, a difference in parallax between captured images of a physical space and images of a virtual object is reduced.

18 Claims, 12 Drawing Sheets

(56) References Cited

U.S. PATENT DOCUMENTS

| | | | |
|---|---|---|---|
| 6,518,939 B1* | 2/2003 | Kikuchi | 345/8 |
| 7,196,721 B2 | 3/2007 | Uchiyama | |
| 2002/0081019 A1* | 6/2002 | Katayama et al. | 382/154 |
| 2003/0197933 A1* | 10/2003 | Sudo et al. | 359/464 |
| 2003/0206653 A1* | 11/2003 | Katayama et al. | 382/154 |
| 2003/0214734 A1* | 11/2003 | Nishioka et al. | 359/846 |
| 2004/0012600 A1* | 1/2004 | Deering et al. | 345/506 |
| 2004/0027451 A1* | 2/2004 | Baker | 348/46 |
| 2004/0108971 A1* | 6/2004 | Waldern et al. | 345/8 |
| 2004/0109009 A1* | 6/2004 | Yonezawa et al. | 345/632 |
| 2004/0150728 A1* | 8/2004 | Ogino | 348/239 |
| 2006/0072206 A1 | 4/2006 | Tsuyuki et al. | |
| 2006/0088206 A1* | 4/2006 | Era | 382/154 |
| 2007/0097206 A1* | 5/2007 | Houvener et al. | 348/26 |
| 2007/0132662 A1* | 6/2007 | Morita | 345/8 |
| 2008/0204663 A1* | 8/2008 | Balogh | 353/10 |
| 2009/0153437 A1* | 6/2009 | Aharoni | 345/8 |

FOREIGN PATENT DOCUMENTS

| | | | |
|---|---|---|---|
| JP | 2003-244521 | 8/2003 | |
| JP | 2006-108868 | 4/2006 | |
| JP | 2006-285609 | 10/2006 | |
| WO | WO 2005/116939 | * 12/2005 | G06T 17/40 |

OTHER PUBLICATIONS

International Search Report and Written Opinion in PCT/JP2008/054681.

Extended European Search Report in European Patent Appln. No. 08 72 2078, Sep. 14, 2012.

* cited by examiner

F I G. 5
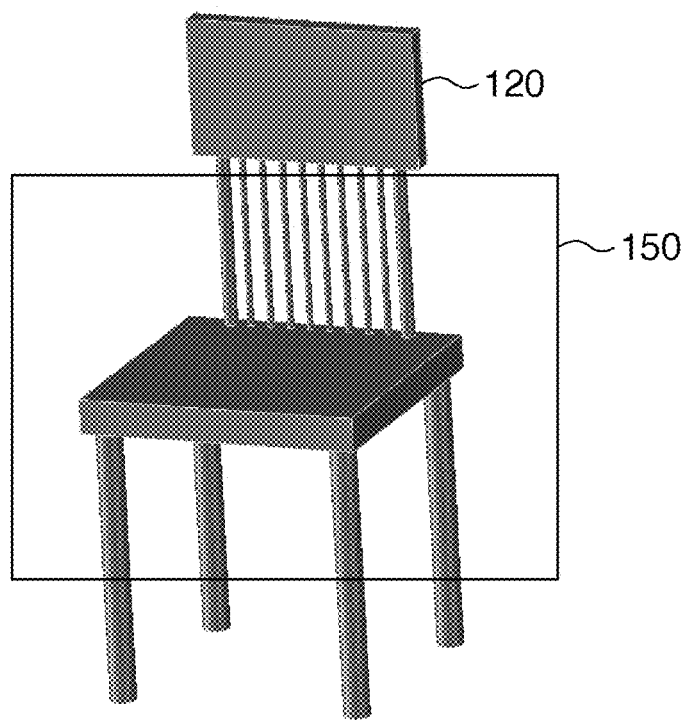

F I G. 11
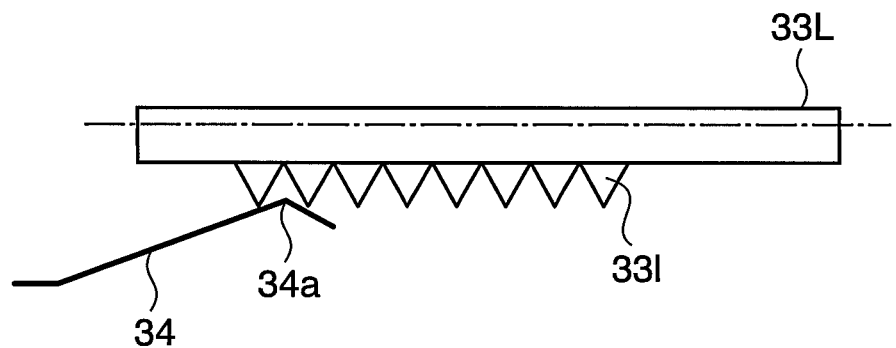

HEAD MOUNTED IMAGE-SENSING DISPLAY DEVICE AND COMPOSITE IMAGE GENERATING APPARATUS

TECHNICAL FIELD

The present invention relates to a head mounted image-sensing display device, and more particularly to a head mounted image-sensing display device capable of performing a three-dimensional display by representing parallax images in both the left and right eye.

The present invention also relates to a composite image generating apparatus that generates an image for display on this kind of head mounted image-sensing display device.

BACKGROUND ART

In recent years, MR systems are known that allow an observer to experience mixed reality (MR) in which a virtual object seems to exist in a physical space. In an MR system, a composite image is generated by aligning and combining a real image of a physical space that is captured from the observer's observation point and a computer graphics (CG) image that represents a virtual object. The composite image is then represented to the observer.

At this time, a head mounted display device (HMD) is generally utilized as a display apparatus that represents the composite image to the observer. Normally, an image-sensing device for capturing a physical space image of the observer's observation point is provided in a HMD that is used with an MR system. In a case in which the HMD is configured so as to be capable of representing independent video images in the left and right eyes, respectively, in many cases the image-sensing device will also have independent configurations for the right eye and the left eye. Hereunder, a HMD provided with an image-sensing device is referred to as a "head mounted image-sensing display device".

In this kind of head mounted image-sensing display device, when the image sensing directions of a pair of image-sensing devices and the parallax of a pair of CG images that are combined with left and right images that are picked up by the image-sensing device do not match, the CG images that are observed appear unnatural and seamlessness with the physical space is not obtained. There is also a risk that the observer will feel a sense of fatigue while observing the unnatural image.

To solve this problem, technology has been proposed that adjusts a display unit to conform to the eye width of the observer and generates a CG image including parallax in accordance with the adjustment amount thereof. This technology also attempts to substantially match the optical axis of an image-sensing optical system that corresponds to both the left and right eyes and the optical axis of a display optical system (Japanese Patent Laid-Open No. 2006-108868).

According to the aforementioned technology, by performing eye width adjustment, generating an image by taking into account the parallax thereof, and making the image sensing optical axis and the display optical axis match, it seems that an effect can be expected whereby the parallax of the virtual image and the actual image are matched. However, this effect can only be expected in a case in which, for a head mounted image-sensing display device, assembly is carried out so that the values for a base line length and an image sensing direction of an image-sensing device are in accordance with the design values.

When assembly is performed with values that differ from the design values, ultimately a mismatch between the parallax of a real image and a CG image is not overcome. Therefore, there is still a risk that the observer wearing the head mounted image-sensing display device will feel a sense of discomfort and a sense of fatigue.

DISCLOSURE OF INVENTION

The present invention has been made in consideration of the above-described problem of the prior art. An object of the present invention is to provide a head mounted image-sensing display device that is capable of generating a composite image in which a difference in parallax between a picked up image of a physical space and an image of a virtual object is reduced.

According to an aspect of the present invention, there is provided a head mounted image-sensing display device comprising: a pair of image-sensing means for stereoscopically capturing a physical space and outputting a pair of stereoscopic images; display means for displaying an image for a right eye and an image for a left eye, based on the pair of stereoscopic images; and storage means for storing image sensing parameters that are previously measured for the pair of image-sensing means.

According to another aspect of the present invention, there is provided a composite image generating apparatus, comprising: composite image generation means for, based on image sensing parameters that represent a positional relationship of a plurality of image-sensing means that pick up images of a physical space, combining a virtual object with at least any one of the physical space images that are picked up by the plurality of image-sensing means to generate a composite image; positional relationship detection means for detecting a change in a positional relationship of the plurality of image-sensing means; and parameter changing means for changing the image sensing parameters in accordance with a change in a positional relationship that is detected by the positional relationship detection means.

Further features of the present invention will become apparent from the following description of exemplary embodiments with reference to the attached drawings.

BRIEF DESCRIPTION OF DRAWINGS

FIG. 5 is a view that illustrates an example of a region of a physical space that is picked up with the right eye optical unit shown in FIG. 2;

FIG. 11 is a view that illustrates a separate example of a click mechanism for eye width adjustment in the head mounted image-sensing display device according to the second embodiment of the present invention.

BEST MODE FOR CARRYING OUT THE INVENTION

Preferred embodiments of the present invention will now be described in detail in accordance with the accompanying drawings.

(First Embodiment)

Figure 1:
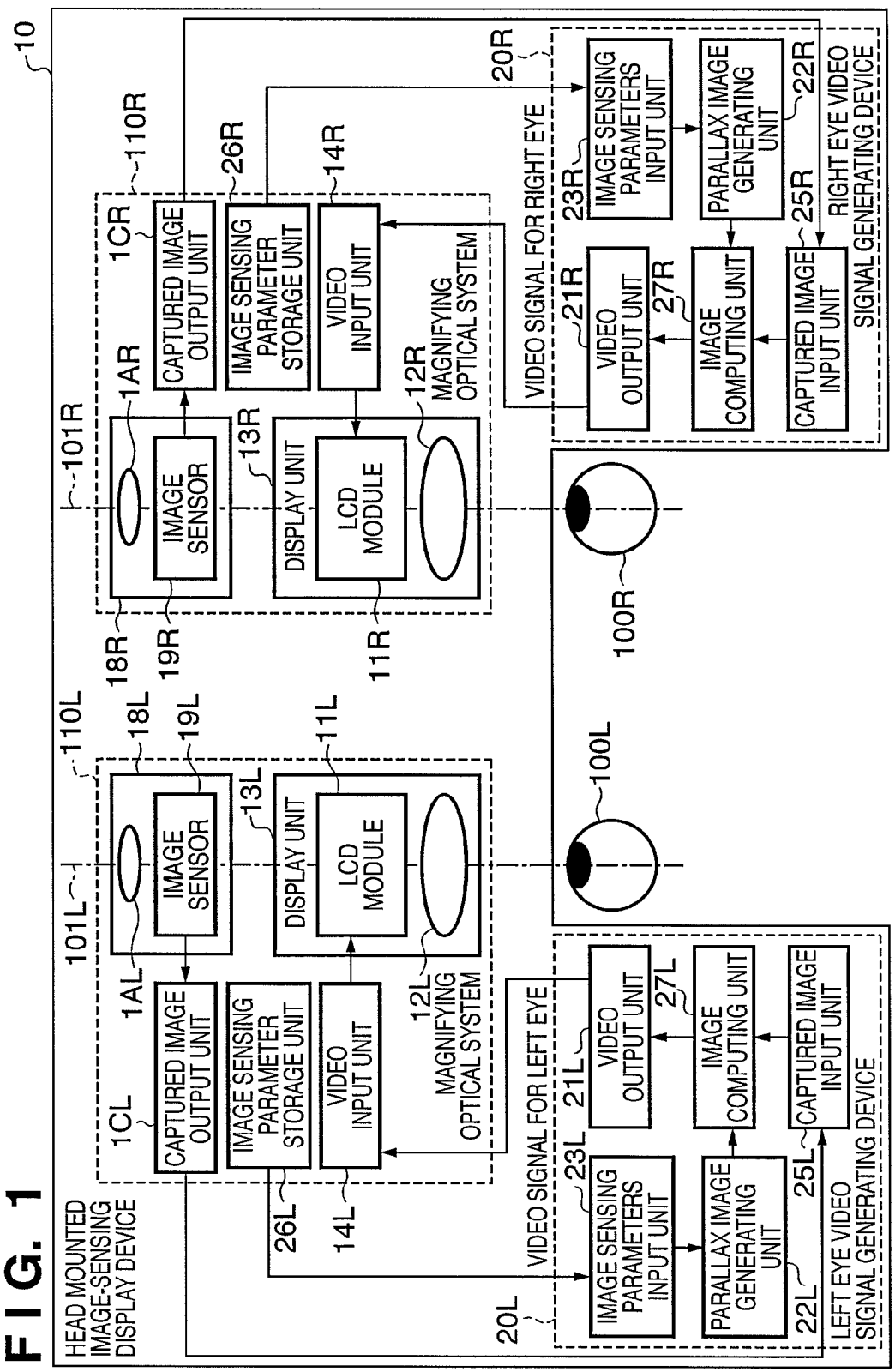
FIG. 1 is a view that illustrates a configuration example of an MR system that uses a head mounted image-sensing display device according to a first embodiment of the present invention.

FIG. 1 is a view that illustrates a configuration example of an MR system that uses a head mounted image-sensing display device according to the first embodiment of the present invention.

In the present embodiment, a case is described in which a head mounted image-sensing display device has a configuration that performs composite image generation processing including generation of a CG image and combination thereof with a real image. However, a configuration relating to generation of a composite image is not essential in a head mounted image-sensing display device, and the same processing may be implemented in an external device.

A head mounted image-sensing display device 10 has a pair of optical units consisting of a right eye optical unit 110R and a left eye optical unit 110L that correspond to a right eye 100R and a left eye 100L of an observer, and a pair of video signal generating devices consisting of a right eye video signal generating device 20R and a left eye video signal generating device 20L. The optical units 110R and 110L have display units 13R and 13L, video input units 14R and 14L, image-sensing units 18R and 18L, captured image output units 1CR and 1CL, and image sensing parameter storage units 26R and 26L. The display units 13R and 13L function as a right eye display device that displays images for the right eye and a left eye display device that displays images for the left eye, respectively. The display units 13R and 13L have LCD modules 11R and 11L as display devices, and magnifying optical systems 12R and 12L that magnify display images at the LCD modules 11R and 11L.

The LCD modules 11R and 11L have a liquid crystal panel such as a p-Si TFT or an LCOS (Liquid Crystal On Silicon), a peripheral circuit such as a driving circuit that drives the liquid crystal panel, and a light source such as a backlight or a front light (none of these are shown in the drawings). The LCD modules 11R and 11L are disposed on an image plane of the magnifying optical systems 12R and 12L. Therefore, after an image that is rendered on the LCD modules 11R and 11L passes through an optical element in the magnifying optical systems 12R and 12L, the image is projected toward the right eye 100R and the left eye 100L of the observer wearing the head mounted image-sensing display device 10. As a result, the observer wearing the head mounted image-sensing display device 10 can observe the display image at the LCD modules 11R and 11L in a magnified state.

The pair of image-sensing units 18R and 18L that are stereoscopic image-sensing devices have image sensors 19R and 19L such as a CMOS sensor or a CCD sensor, drive circuits (not shown) that drive the image sensors 19R and 19L, and image sensing lenses 1AR and 1AL. An optical image of an imaging object is formed by the image sensing lenses 1AR and 1AL on the image plane of the image sensors 19R and 19L. This optical image is converted into electrical signals in pixel units by a photoelectric conversion action of the image sensors 19R and 19L. The image-sensing units 18R and 18L sense and output stereoscopic images of a physical space. In the present embodiment, the image-sensing units 18R and 18L and the display units 13R and 13L are disposed so that the image sensing optical axis of the image-sensing units 18R and 18L and the optical axis on the projection side of the display units 13R and 13L substantially match.

The image sensing parameter storage units 26R and 26L store parameters that define an optical axis or image sensing region of the image-sensing optical system of the image-sensing units 18R and 18L, such as an image sensing optical axis direction, a base line length, a principal point position, a focal distance, tilt values for each of the x, y, and z axes, and lens distortion correction data. The image sensing parameter storage units 26R and 26L are, for example, configured with a nonvolatile storage element, such as an EEPROM, whose contents are not erased even when the power is disconnected.

The video signal generating devices 20R and 20L have image sensing parameters input units 23R and 23L, parallax image generating units 22R and 22L, video output units 21R and 21L, captured image input units 25R and 25L, and image computing units 27R and 27L, respectively. The video signal generating devices 20R and 20L generate and output video signals for the right eye and left eye using image sensing parameters and captured images from the right eye optical unit 110R and the left eye optical unit 110L.

The captured image output units 1CR and 1CL execute electrical processing such as A/D conversion or amplification with respect to electrical signals that correspond to optical images of an imaging object that are output by the image sensors 19R and 19L, and supply the results to the captured image input units 25R and 25L of the video signal generating devices 20R and 20L.

The image sensing parameters input units 23R and 23L read out the recording contents of the image sensing parameter storage units 26R and 26L and output the image sensing parameters that are read out to the parallax image generating units 22R and 22L.

The parallax image generating units 22R and 22L generate images (parallax images) of a virtual object for the right eye and left eye based on the input image sensing parameters and three-dimensional model information of the virtual object.

The image computing units 27R and 27L combine stereoscopic images from the captured image input units 25R and 25L with parallax images from the parallax image generating units 22R and 22L to generate composite images for the right eye and left eye. The composite images are supplied to the video input units 14R and 14L through the video output units 21R and 21L.

(Operation)

Operations to align a CG image and a real image in the head mounted image-sensing display device 10 having the above configuration will now be described.

As described above, in the present embodiment the image sensing optical axis of the image-sensing units 18R and 18L and the optical axis on the projection side of the display units 13R and 13L are disposed so that they are substantially matching. Therefore, in the following description they are expressed simply as "optical axis" of an "optical unit".

Figure 2:
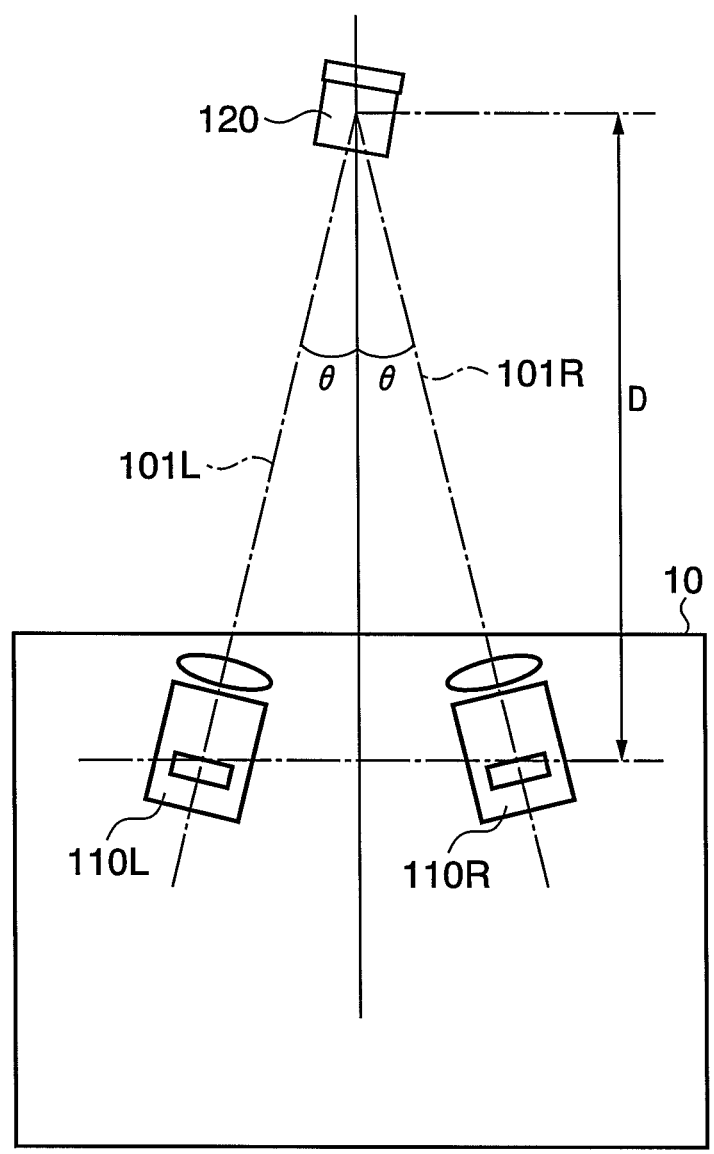
FIG. 2 is a top view that illustrates an example of the positional relationship between an object in a physical space and optical axes 101R and 101L of a right eye optical unit 110R and a left eye optical unit 110L in a case in which assembly of a head mounted image-sensing display device 10 is performed correctly.

FIG. 2 is a top view that illustrates an example of the positional relationship between an object in a physical space and optical axes 101R and 101L of the right eye optical unit 110R and the left eye optical unit 110L in a case in which assembly of the head mounted image-sensing display device 10 is performed correctly.

Figure 4:
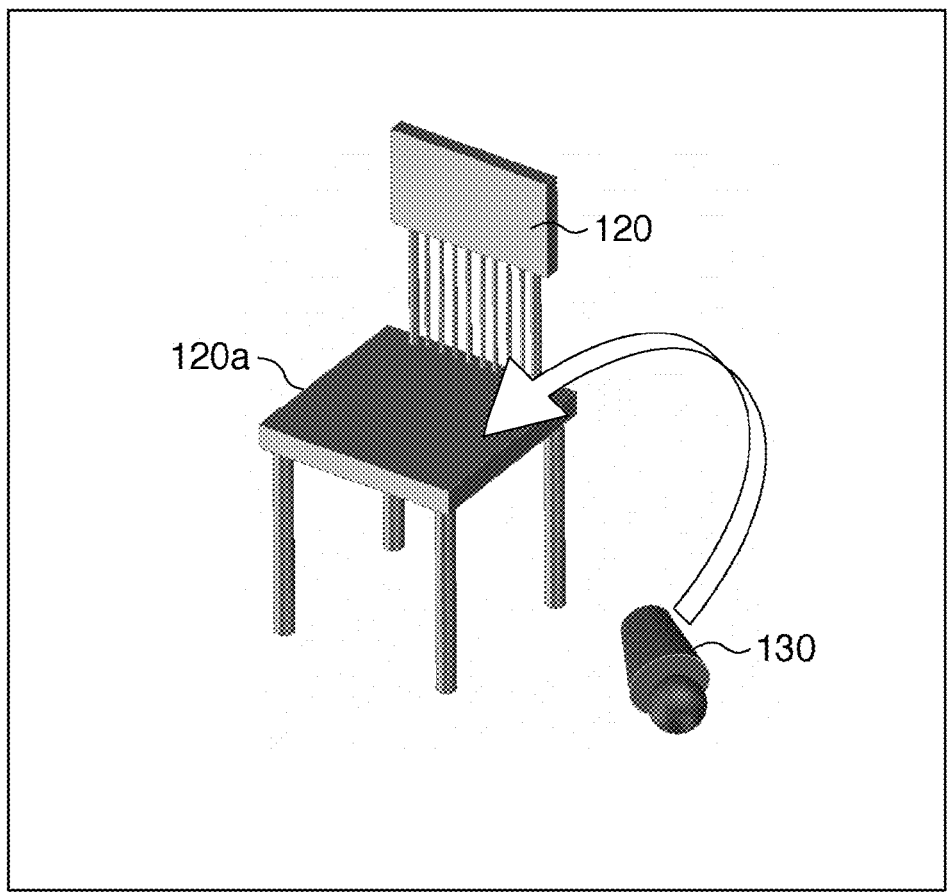
FIG. 4 is a view that illustrates an example of fusion between an image of a virtual object and an image of a physical space represented by the MR system according to the first embodiment of the present invention.

For this positional relationship, a case will be considered of combining an image in which a virtual object 130 is mounted on a flat part 120a on a real object 120 in a physical space, as shown in FIG. 4. As shown in FIG. 2, it is assumed that both the left and right optical units 110R and 110L are respectively mounted with a convergence angle θ, and the two optical axes 101R and 101L of the right eye optical unit 110R and the left eye optical unit 110L intersect at a point at a distance D from the image plane.

Further, when the right eye optical unit 110R is attached at the correct convergence angle θ, it is assumed that a portion surrounded by an image pickup region 150 shown in FIG. 5 is captured by the image-sensing unit 18R. However, there are frequently cases in the production process in which the convergence angle deviates from the correct angle when an optical unit is attached.

Figure 3:
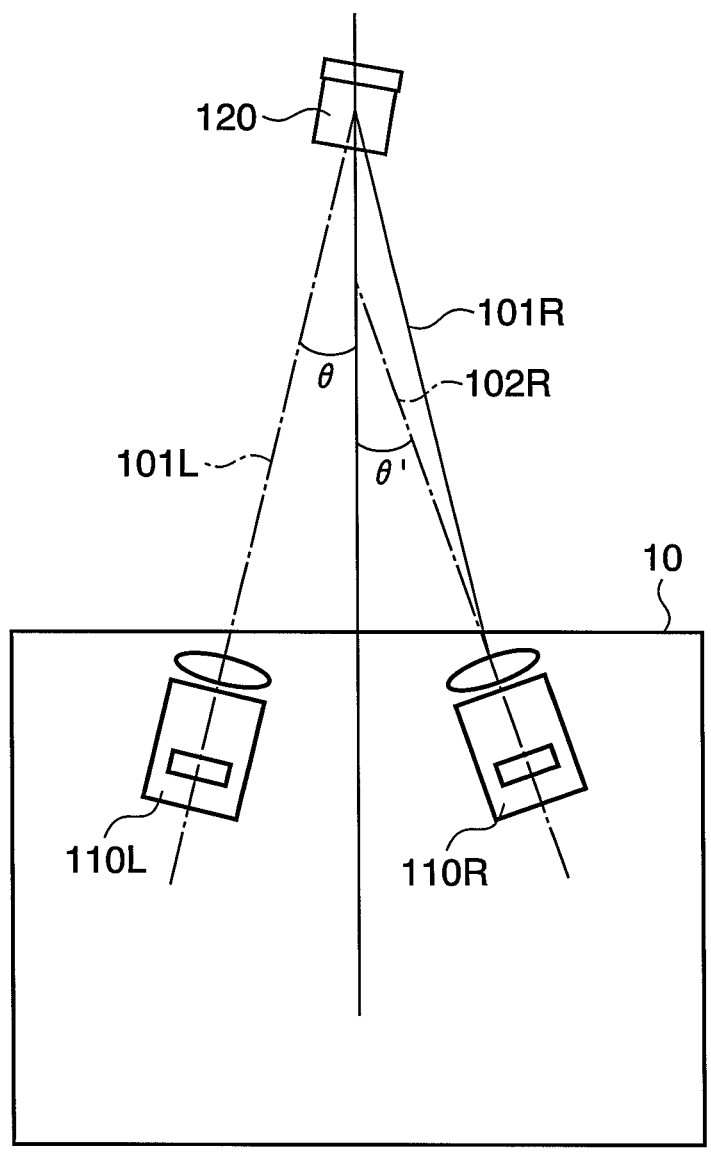
FIG. 3 is a top view that illustrates an example of the positional relationship between an object in a physical space and optical axes 101R and 101L of a right eye optical unit 110R and a left eye optical unit 110L in a case in which assembly of a head mounted image-sensing display device 10 is not performed correctly.
Figure 6:
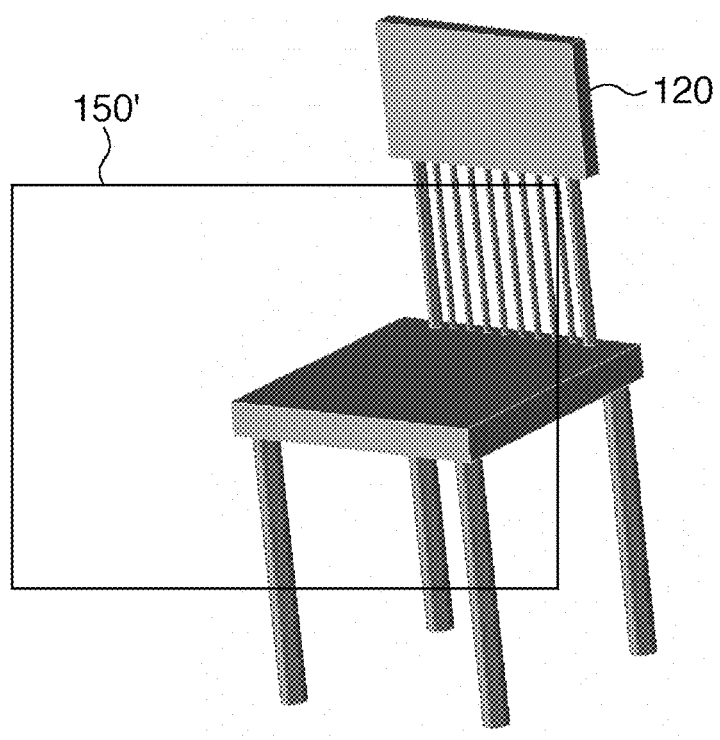
FIG. 6 is a view that illustrates an example of a region of a physical space that is picked up with the right eye optical unit shown in FIG. 3.

For example, when the right eye optical unit 110R is attached at a convergence angle θ' as shown in FIG. 3, the range that is captured by the image-sensing unit 18R is the portion surrounded by an image pickup region 150' in FIG. 6, which is different to the original image pickup region 150.

When information regarding the convergence angle θ' at which the right eye optical unit 110R is actually attached can not be obtained, it is not possible to generate a CG image (parallax image) of the virtual object 130 in which the virtual object 130 is displayed in a condition in which it is correctly aligned with the physical space image that is picked up by the image-sensing unit 18R.

Figure 8:
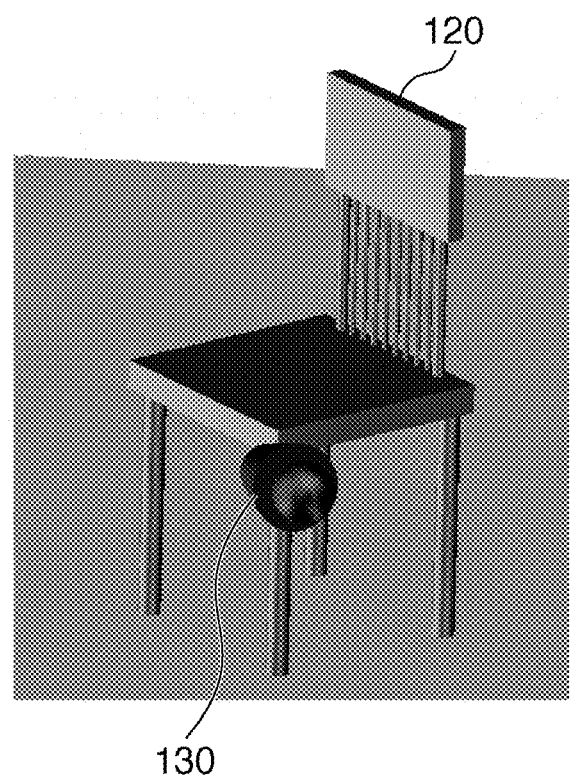

Thus, when the parallax images are generated according to the design value θ and combined with an actual image even though the actual convergence angle θ' deviates from the design value θ, as shown in FIG. 8, the virtual object is displayed at a position that deviates from the location at which the virtual object should originally be disposed.

Figure 7:
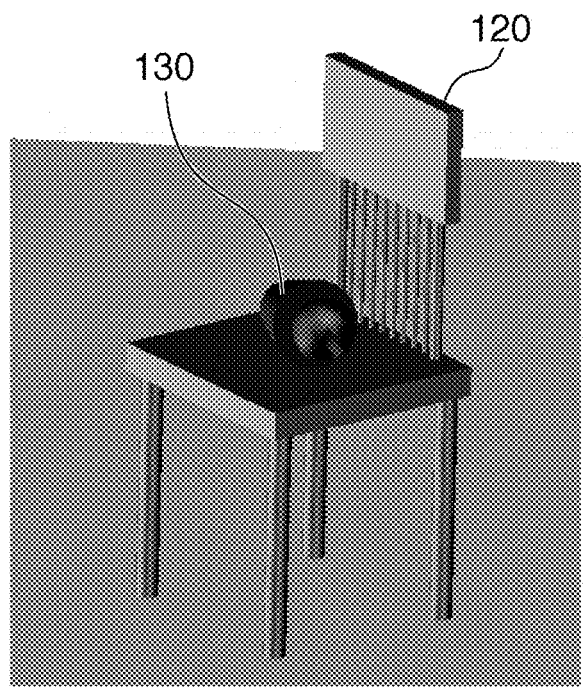
FIG. 7 and FIG. 8 are views that illustrate examples of a composite image in a case in which a parallax image is generated using design values irrespective of the fact that a convergence angle of an optical unit is out of alignment with a design value.

Although a case is described here in which the attachment angle of an optical unit 110 is misaligned in the horizontal direction, in some cases a misalignment also arises in the attachment angle in the vertical direction. In that case, as shown in FIG. 7, a composite image is generated in which the virtual object 130 is embedded in the real object 120 or, as shown in FIG. 8, a composite image is generated in which the virtual object 130 is suspended in mid-air.

In contrast, according to the present embodiment, parallax information that is unique to the individual head mounted image-sensing display device 10 is stored as image sensing parameters in the image sensing parameter storage units 26R and 26L. In this case, the following kinds of information can be exemplified as parallax information according to the present embodiment:

exact base line lengths of the image-sensing units 18R and 18L and the display units 13R and 13L;

the actual convergence angle θ;

the focal distance, imaging angle of view, F number, and principal point position of image-sensing optical systems of the image-sensing units 18R and 18L; and the optical axis directions of the optical units 110, and the like.

In this connection, as long as it is possible to generate parallax images that have the same parallax as images picked up by the image-sensing units 18R and 18L, the image sensing parameters may be fewer than the parameters exemplified here, or conversely, even more parameters may be stored.

These image sensing parameters are previously measured or calculated, and stored in the image sensing parameter storage units 26R and 26L as unique parameters of the optical units 110 of the head mounted image-sensing display device 10.

Thereafter, when using the parallax image generating units 22R and 22L to generate parallax images of the virtual object 130 to be superimposed on actual images that are picked up by the image-sensing units 18R and 18L, the unique image sensing parameters of the optical units 110 are read out from the image sensing parameter storage units 26R and 26L and used.

Thus, by generating parallax images using unique image combine sensing parameters of the optical units 110, images of the virtual object 130 are generated that are correctly aligned with the actual images. Therefore, even in a case as shown, for example, in FIG. 3, in which the convergence angle θ' of the optical unit 110R differs from the design value θ, the parallax image generating unit 22R generates a parallax image of the virtual object 130 in accordance with the image sensing parameters that are unique to the optical unit 110R, beginning with the actual convergence angle θ'. In this connection, it is assumed that three-dimensional model information (information relating to shape, color, texture, three-dimensional position or the like) of the virtual object 130 is previously stored in the parallax image generating units 22R and 22L.

Likewise, at the parallax image generating unit 22L, image sensing parameters that are unique to the optical unit 110L are read out from the image sensing parameter storage unit 26L to generate a parallax image for the left eye using the image sensing parameters that are read out and the three-dimensional model information of the virtual object.

The parallax images generated by the parallax image generating units 22R and 22L are transferred to the image computing units 27R and 27L. At the image computing units 27R and 27L, the parallax images are subjected to computational processing such as addition, multiplication, subtraction, or division with respect to the captured images of physical space picked up by the image-sensing units 18R and 18L to thereby generate composite images for the right eye and the left eye.

The composite image for the right eye and the composite image for the left eye are transferred to the video output units 21R and 21L to be displayed on the LCD modules 11R and 11L of the display units 13R and 13L via the video input units 14R and 14L. As described above, after the display contents of the LCD modules 11R and 11L are magnified by the magnifying optical systems 12R and 12L, the contents are projected onto the right eye 100R and left eye 100L of the observer wearing the head mounted image-sensing display device 10.

Thus, according to the present embodiment, it is possible to combine correctly aligned parallax images of the virtual object 130 with images of physical space that are picked up by the image-sensing units 18R and 18L. Accordingly, the observer who observes the composite images generated by the image computing units 27R and 27L can perceive that the virtual object 130 is correctly disposed on the real object 120 in a physical space.

Each image sensing parameter (camera parameter) stored in the image sensing parameter storage units 26R and 26L can be measured by an arbitrary method as long as the parameter values can be obtained at an acceptable accuracy. For example, the parameters can be measured according to a method disclosed in Japanese Patent Laid-Open No. 2003-244521. According to this method, a calibration pattern is picked up by the image-sensing units 18R and 18L, and the image-sensing units 18R and 18L calculate or estimate the camera parameters for the picked-up image by analyzing the picked-up image.

Although the configuration as described above according to the present embodiment is one in which video signal generating devices 20R and 20L are incorporated into the head mounted image-sensing display device 10, processing to generate parallax images or composite images may be performed by an external device.

At that time, the image computing units 27R and 27L and the parallax image generating units 22R and 22L in the video signal generating devices 20R and 20L can be implemented, for example, using software by executing a software program with a computer. Further, the captured image output units 1CR and 1CL and the captured image input units 25R and 25L can be implemented with a wired communication interface that conforms to a standard such as USB or IEEE 1394 or a wireless communication interface that conforms to a standard such as IEEE 802.11x. The video input units 14R and 14L or the video output unit 21R and 21L can also be implemented by a similar interface.

As described above, according to the present embodiment, in a head mounted image-sensing display device comprising an image-sensing device and a display device, unique image sensing parameters are previously stored in an image-sensing optical system of the image-sensing device. It is therefore possible to know the conditions under which an image picked up by the image-sensing device is picked up. Thus, for example, when aligning an image of a virtual object with an image that is picked up with an image-sensing device to form a composite image, an effect is obtained whereby it is possible to generate a composite image with high alignment accuracy. In particular, this is advantageous when generating a composite image for providing an observer with a sense of virtual reality or mixed reality.

(Second Embodiment)

The second embodiment of the present invention will now be described.

Figure 9:
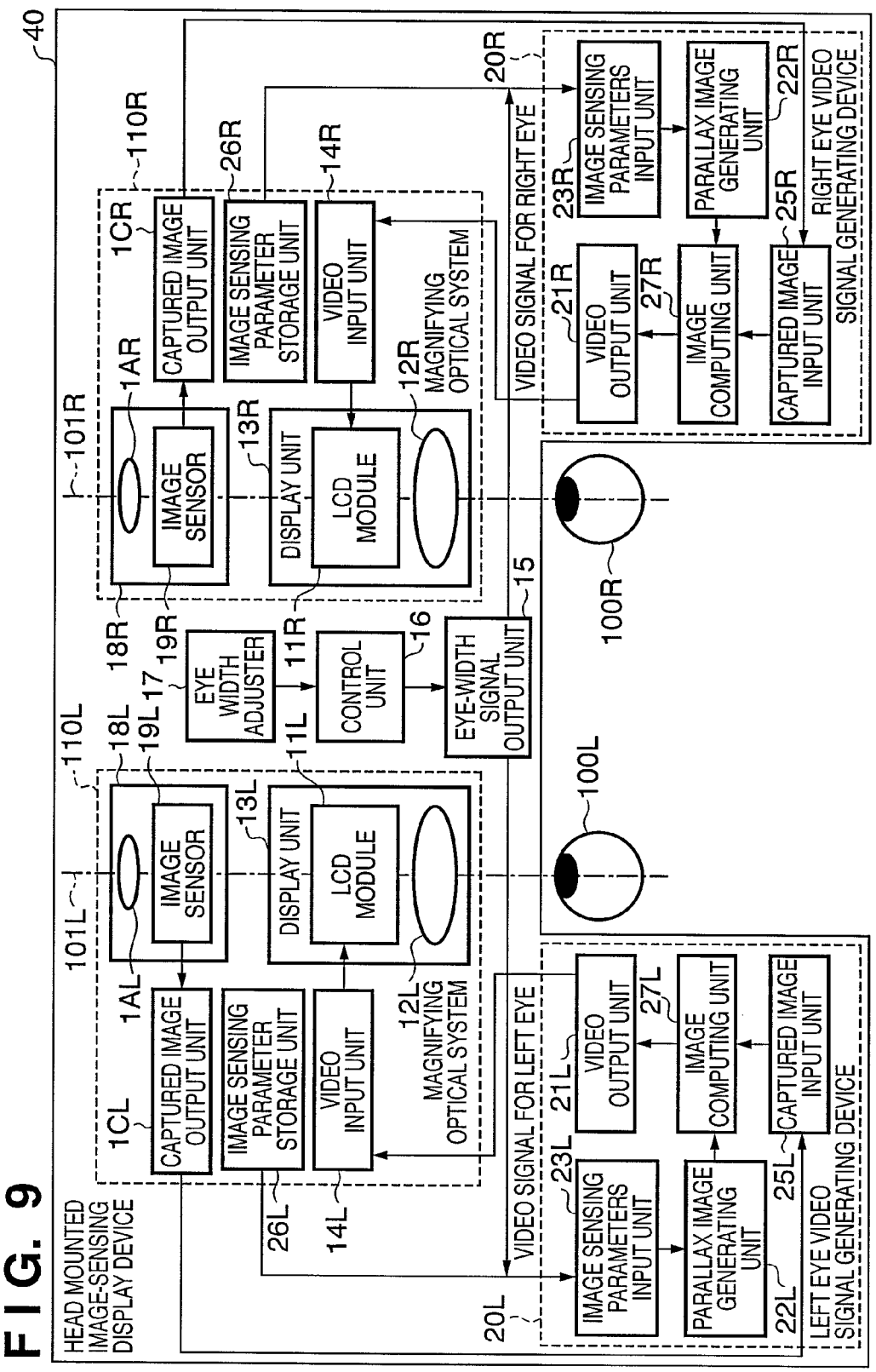
FIG. 9 is a view that illustrates a configuration example of an MR system that uses a head mounted image-sensing display device according to a second embodiment of the present invention.

FIG. 9 is a view that illustrates a configuration example of an MR system that uses a head mounted image-sensing display device according to a second embodiment of the present invention. In FIG. 9, elements that are the same as elements described according to the first embodiment are denoted by the same reference numerals and a detailed description of those elements is omitted.

The image display system according to the present embodiment is the same as the MR system according to the first embodiment. Therefore, the fundamental configuration of a head mounted image-sensing display device 40 is common with that of the head mounted image-sensing display device 10. However, a difference from the first embodiment is that the head mounted image-sensing display device 40 is configured with the respective image-sensing optical systems and display optical systems on the left and right in an integrated state so that the base line length thereof is changeable. More specifically, the head mounted image-sensing display device 40 according to the present embodiment has, in addition to the configuration of the head mounted image-sensing display device 10, an eye width adjuster 17, a control unit 16, and an eye-width signal output unit 15.

By adopting this configuration, it is possible to adjust the base line length to match the eye width of each individual observer. Accordingly, by generating a composite image that takes into account the base line length after adjustment, it is possible to further reduce the burden of the observer.

On the other hand, since the base line length is variable, if the method described according to the first embodiment in which previously measured fixed values are stored as image sensing parameters and then utilized is employed, it will not be possible to generate parallax images that reflect an adjusted eye width.

Consequently, according to the present embodiment a base line length of the image-sensing optical systems and display optical systems that are integrated on the left and right sides, respectively, is acquired and calculated as eye width data in the manner described below.

The control unit 16 reads in an eye-width setting value that is adjusted at the eye width adjuster 17 as an electrical signal, and passes the data to the eye-width signal output unit 15. The eye-width signal output unit 15 outputs a signal corresponding to the eye-width setting value to the image sensing parameters input units 23R and 23L.

The image sensing parameters input units 23R and 23L read out from the image sensing parameter storage units 26R and 26L the image sensing parameters that correspond to the signal received from the eye-width signal output unit 15. According to the present embodiment, various image sensing parameters associated with a plurality of base line lengths, respectively, are previously measured and stored in the image sensing parameter storage units 26R and 26L, and thus image sensing parameters that are in accordance with the relevant base line length are read out.

Figure 10:
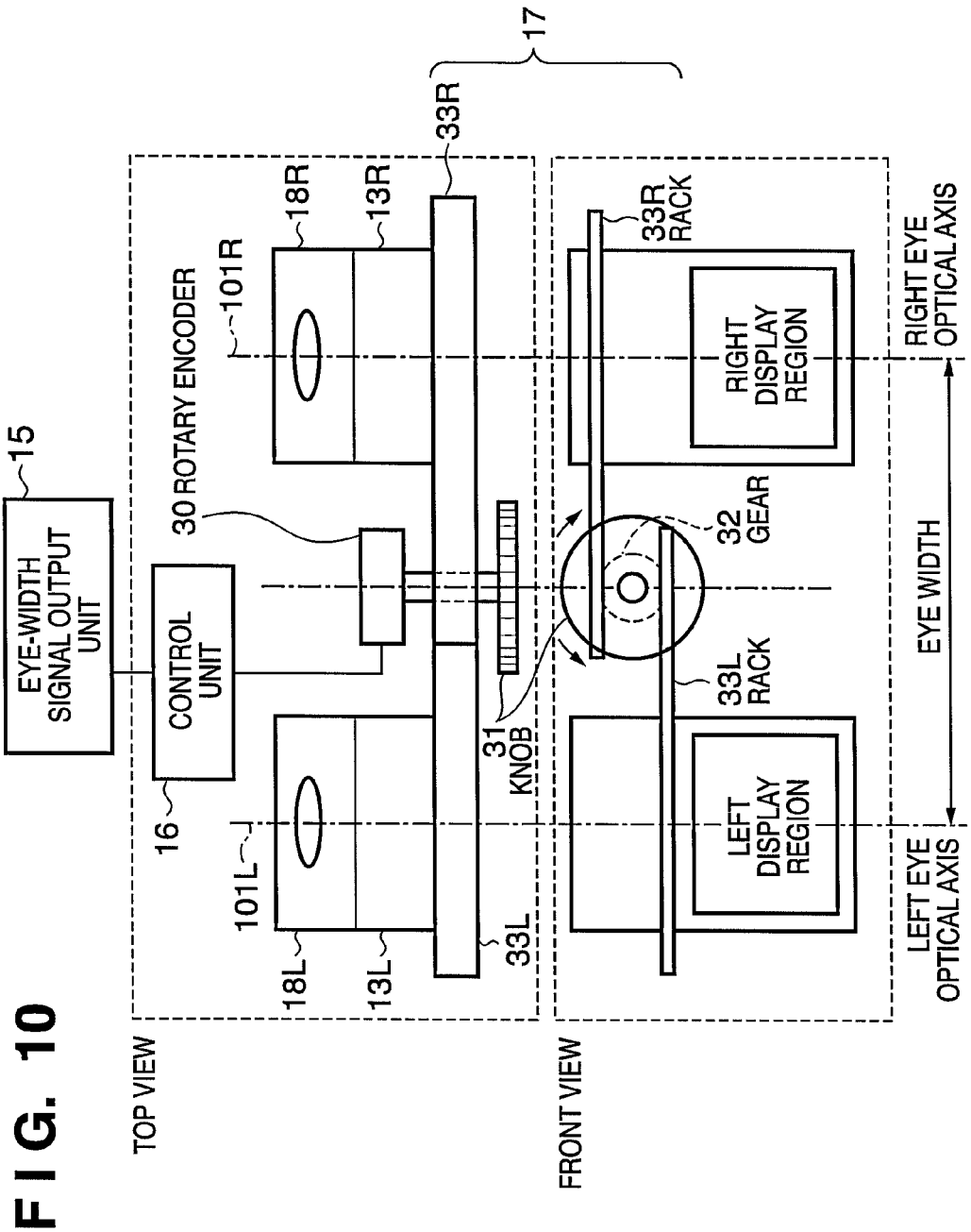
FIG. 10 is a view that illustrates a configuration example of an eye width adjuster in the head mounted image-sensing display device according to the second embodiment of the present invention.

FIG. 10 is a view illustrating a specific configuration example of the eye width adjuster 17.

In FIG. 10, the eye width adjuster 17 has a pair of racks 33R and 33L, a gear 32, an adjustment knob 31, and a rotary encoder 30.

The adjustment knob 31 and the gear 32 are fixed on the same shaft, and the rotary encoder 30 detects the amount of rotation of the shaft, that is, the rotation angle of the adjustment knob 31. One end of each rack in the pair of racks 33R and 33L is fixed to the right eye optical unit 110R and the left eye optical unit 110L, respectively, and the other end portion is configured so as to intermesh with the gear 32.

According to the eye width adjuster 17 having this configuration, when the observer rotates the adjustment knob 31, the left and right optical units 110L and 110R are simultaneously moved in a parallel manner by the same amount in opposite directions to thereby change the base line length. More specifically, in FIG. 10, when the adjustment knob 31 is rotated clockwise, the racks 33R and 33L move in directions that move the optical units 110R and 110L away from each.

The rotation angle of the adjustment knob 31 (or the rotation angle of the gear 32) is detected by the rotary encoder 30. The rotary encoder 30 comprises an unshown internal click mechanism, and is configured to be capable of stopping at each predetermined rotation angle.

At a time of adjustment during the stage of producing and assembling the head mounted image-sensing display device 40 of the present embodiment, corresponding image sensing parameters are measured for each predetermined angle that corresponds to a click mechanism of the rotary encoder 30. The measurement results are then stored in the image sensing parameter storage units 26R and 26L that are configured with a nonvolatile storage element such as an EEPROM.

In the present embodiment, similarly to the first embodiment, the image sensing parameters are:

the base line lengths of the image-sensing units 18R and 18L and the display units 13R and 13L;

the actual convergence angle θ;

the focal distance, imaging angle of view, F number, and principal point position of image-sensing optical systems of the image-sensing units 18R and 18L; and the optical axis direction of the optical unit 110, and the like.

Taking these multiple parameters as one set, a plurality of sets of image sensing parameters that correspond to the rotation angle of the adjustment knob 31, in other words, the adjusted eye width, are stored in the image sensing parameter storage units 26R and 26L.

At the control unit 16 that is configured with a circuit using a microcomputer or the like, a value corresponding to the current rotation angle of the shaft, that is, a value corresponding to the eye width, is determined based on a pulse that is output in accordance with rotation of the shaft by the rotary encoder 30. The control unit 16 outputs a value corresponding to the rotation angle to the eye-width signal output unit 15. In this connection, as long as the rotary encoder 30 employs a method capable of detecting the absolute amount of rotation of the rotating shaft, it is also possible to supply the output of a direct rotary encoder 30 to the eye-width signal output unit 15.

The image sensing parameters input units 23R and 23L read out image sensing parameters corresponding to the value from the eye-width signal output unit 15 from the image sensing parameter storage units 26R and 26L.

In this connection, it is not necessary for the aforementioned click mechanism to be built into the rotary encoder 30. For example, as shown in FIG. 11, a similar configuration can be obtained by providing a plurality of grooves 331 in the rack 33L and providing a spring 34 that energizes the rack 33L in the upward direction in the figure and that has a portion 34a that substantially corresponds to the groove 331. That is, by using the configuration shown in FIG. 11, positions at which the optical units 110 stop can be provided in a stepwise condition by means of the intervals between the grooves 331.

The position of the optical unit 110 may also be detected using a device other than the rotary encoder 30. For example, a linear potentiometer comprising a variable resistor, or means that applies a magnetic field to an optical unit and detects a magnetic gradient may be utilized.

When a mechanism that regulates a stop position of the optical unit 110, such as a click function, is not provided, image sensing parameters that correspond to a rotation angle (or eye width) other than a rotation angle (or eye width) measured at the time of adjustment at the production and assembly stage do not exist. However, by interpolating image sensing parameters corresponding to rotation angles prior to and after the measured rotation angle it is possible to determine image sensing parameters that correspond to the actual rotation angle (or eye width).

An arbitrary method is used by the image sensing parameters input units 23R and 23L to read out the image sensing parameters. For example, a readout request is sent from the image sensing parameters input units 23R and 23L to the image sensing parameter storage units 26R and 26L. In this case the image sensing parameter storage units 26R and 26L associate and store a plurality of rotation angles/eye widths and image sensing parameters. Therefore, by including a rotation angle/eye width in the request signal, image sensing parameters corresponding to the rotation angle in question can be read out from the image sensing parameter storage units 26R and 26L.

At the parallax image generating units 22R and 22L, parallax images of a virtual object are generated in accordance with the image sensing parameters that are read out from the image sensing parameters input units 23R and 23L. The image computing units 27R and 27L combine the parallax images from the parallax image generating units 22R and 22L with stereoscopic images from the captured image input units 25R and 25L to generate composite images. The image computing units 27R and 27L output the composite images to the video input units 14R and 14L of the head mounted image-sensing display device 40 via the video output units 21R and 21L.

As a result, composite images in which parallax images are superimposed on captured images are displayed on the LCD modules 11R and 11L. According to the present embodiment, by having the eye width adjuster 17 the invention can substantially eliminate parallax between the line of sight of the observer and the optical axes 101R and 101L of the image-sensing units 18R and 18L and the display units 13R and 13L.

It is therefore possible for the observer to visually recognize substantially the same state when wearing the head mounted image-sensing display device 40 and when not wearing the head mounted image-sensing display device 40. Thus, the sense of fatigue of the observer can be controlled.

Figure 12:
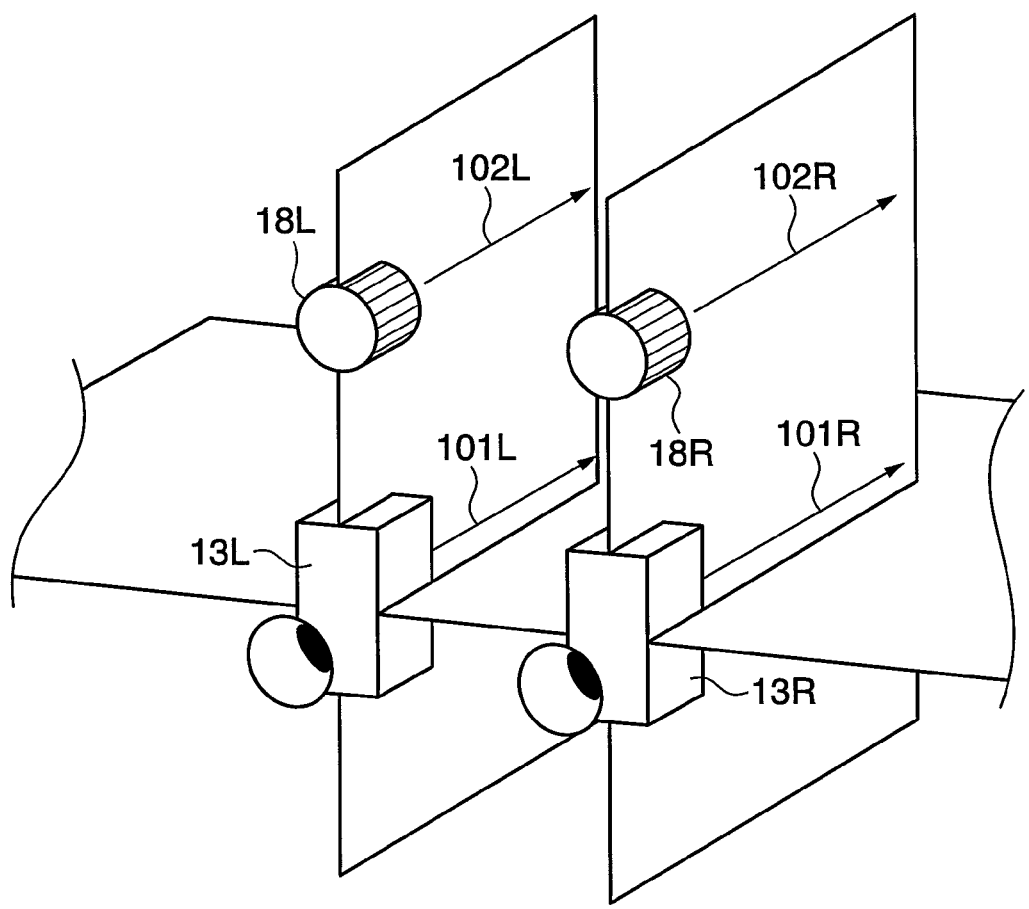
FIG. 12 is a view that describes another arrangement example of an image-sensing unit in the head mounted image-sensing display device according to the second embodiment of the present invention.

In this connection, as shown in FIG. 12, the image-sensing unit 18L may be disposed so that an optical axis 101L of the image-sensing unit 18L is positioned perpendicular to a plane including an optical axis (optical axis of left display unit 13L) 102L of the left eye of the observer and on a plane that includes the optical axis 102L of the left eye. Likewise, the image-sensing unit 18R may be disposed so that an optical axis 101R of the image-sensing unit 18R is positioned perpendicular to a plane including an optical axis (optical axis of right display unit 13R) 102R of the right eye of the observer and on a plane that includes the optical axis 102R of the right eye.

According to the present embodiment, only a configuration in which the eye width is adjusted manually is described. However, the present invention can also be applied to a head mounted image-sensing display device that automatically adjusts the eye width so that the observer's line of sight matches the optical axes of optical units by using, for example, line of sight detection technology. In this case, only the mechanism for adjusting the eye width is different, and as long as it is possible to acquire a value corresponding to the value of the eye width (base line length) after adjustment, the second embodiment can be applied as it is.

In the present embodiment, since parallax images are generated using image sensing parameters that correspond to an eye width that is adjusted by operating the eye width adjuster 17, an effect of further reducing the burden of the observer can be achieved in addition to the effects of the first embodiment.

Although in the present embodiment, similarly to the first embodiment, a configuration in which the video signal generating devices 20R and 20L are incorporated into the head mounted image-sensing display device 40 is described, processing to generate parallax images or composite images may also be performed by an external device.

(Third Embodiment)

In the above described embodiment, a configuration was described in which image sensing parameters that are unique to a head mounted image-sensing display device are stored in the head mounted image-sensing display device itself. However, as long as it is possible to acquire unique image sensing parameters corresponding to the individual head mounted image-sensing display device, it is not necessary that a storage location of image sensing parameters be inside the corresponding head mounted image-sensing display device.

For example, when constructing an MR system utilizing a plurality of head mounted image-sensing display devices, identification information that can identify a head mounted image-sensing display device is stored, and the corresponding unique image sensing parameters can be associated therewith and stored in a management apparatus that is separate from the head mounted image-sensing display device.

The identification information can then be acquired from the head mounted image-sensing display device connected to the MR system and the corresponding image sensing parameters can be acquired from the management apparatus to enable generation of composite images for the head mounted image-sensing display device in question.

Thus, as long as a device that uses the image sensing parameters can acquire image sensing parameters corresponding to the relevant head mounted image-sensing display device, the image sensing parameters may be stored in any location.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-62481, filed on Mar. 12, 2007, which is hereby incorporated by reference herein its entirety.

The invention claimed is:

1. A head mounted image-sensing display device, comprising:
   a pair of image-sensing units configured to stereoscopically capture a physical space and output a pair of stereoscopic images;
   a storage unit configured to store image-sensing parameters which include a convergence angle of each of the pair of image-sensing units and a base line length between the pair of image-sensing units, which are previously measured, for generating virtual images to be combined with the pair of stereoscopic images;
   a generation unit configured to generate the virtual images using at least one of the convergence angle and the base line length stored by the storage unit and three-dimensional model information, so as to arrange the virtual images correctly in each of the pair of stereoscopic images of the physical space captured by the pair of image-sensing units;
   a composition unit configured to generate composite images by combining the pair of stereoscopic images with the generated virtual images; and
   a display unit configured to display the composite images generated by the composition unit.

2. The head mounted image-sensing display device according to claim 1,
   wherein the display unit includes a left eye display unit and a right eye display unit, and
   wherein the left eye display unit and one of the pair of image-sensing units, and the right eye display unit and the other image-sensing unit are integrated, respectively.

3. The head mounted image-sensing display device according to claim 2, wherein the left eye display unit is disposed so that an optical axis of the left eye display unit matches an optical axis of the one image-sensing unit, and the right eye display unit is disposed so that an optical axis of the right eye display unit matches an optical axis of the other image-sensing unit.

4. The head mounted image-sensing display device according to claim 2, further comprising:
   an adjustment mechanism configured to (i) move the left eye display unit and the one image-sensing unit and (ii) move the right eye display unit and the other image-sensing unit, so as to change the base line length of the pair of image-sensing units.

5. The head mounted image-sensing display device according to claim 4, wherein the storage unit stores a plurality of image sensing parameters that are associated with each of a plurality of base line lengths.

6. The head mounted image-sensing display device according to claim 4, further comprising:
   a base line length acquisition unit configured to acquire the base line length from the adjustment mechanism;
   a parameter acquisition unit configured to acquire from the storage unit image sensing parameters associated with the acquired base line length; and
   a generation unit configured to generate the image the virtual images using the acquired image sensing parameters and the three-dimensional model information.

7. A composite image generating apparatus, comprising:
   a composite image generation unit configured to combine, based on image sensing parameters which (i) represent a positional relationship of a pair of image-sensing units that capture a pair of stereoscopic images of a physical space and (ii) include a convergence angle of each of the pair of image-sensing units and a base line length between the pair of image-sensing units, which are previously measured, a virtual image with at least any one of the physical space images that are picked up by the pair of image-sensing units to generate a composite image;
   a positional relationship detection unit configured to detect a change in a positional relationship of the pair of image-sensing units;
   a parameter changing unit configured to change the image sensing parameters in accordance with a change in a positional relationship that is detected by the positional relationship detection unit; and
   a generation unit configured to generate virtual images combined with the physical space image, using at least one of the convergence angle and the base line length and three-dimensional model information, so as to arrange the virtual images correctly in each of the pair of stereoscopic images of the physical space captured by the pair of image-sensing units;
   a composition unit configured to generate the composite images by combining the physical space image and the image of the virtual image; and
   a display unit configured to display the composite images generated by the composition unit.

8. A method for generating a composite image, comprising the steps of:
   sensing, stereoscopically, a physical space with image-sensing units;
   outputting a pair of stereoscopic images of the physical space;
   generating virtual images using parameters stored in a storage unit and three-dimensional model information so as to arrange the virtual images correctly in each of the pair of stereoscopic images of the physical space, wherein the storage unit stores previously measured parameters including at least one of a convergence angle of the image-sensing units and a base line between the image-sensing units;

generating composite images by combining the pair of stereoscopic images with the generated virtual images; and displaying the generated composite images.

9. A head mounted image-sensing display device comprising:
image-sensing units configured to capture an image of a physical space and outputting the captured image;
a storage unit configured to store image-sensing parameters which are previously measured and which include at least one of a convergence angle of the image-sensing units and a base line between the image-sensing units for generating a virtual image to be combined with the captured image; and
a display unit configured to display a composite image, which is generated by combining the captured image with the virtual image, wherein the virtual image is generated so that the virtual image can be correctly arranged with the captured image, based on the image-sensing parameters.

10. An apparatus comprising:
an obtaining unit configured to obtain a captured image of a physical space and image-sensing parameters, which are previously measured for generating a virtual image and which include at least one of a convergence angle of image-sensing units and a base line of the image-sensing units, when the image-sensing units capture the captured image;
a generation unit configured to generate the virtual image based on the image-sensing parameters and three-dimensional model information, so that the virtual image can be correctly arranged in the captured image; and
a display unit configured to display the virtual image with the captured image.

11. A system comprising:
a head mount display having imaging units which sense a real image and a display unit which displays a composite image, wherein the real image is an image of a physical space; and
an image processing apparatus which generates the composite image to be displayed in the display unit, by combining the real image with a virtual image,
wherein the head mount display further comprises a storage unit configured to storage image-sensing parameters which are previously measured for generating the virtual image to be combined with the real image and which include at least one of a convergence angle of the imaging units and a base line between the imaging units, and
wherein the image processing apparatus further comprises:
an obtaining unit configured to obtain the real image and the image-sensing parameters when the imaging unit captures the real image;
a generation unit configured to generate the virtual image based on the image-sensing parameters and three-dimensional model information, so that the virtual image can be correctly arranged with the real image; and
a composition unit configured to generate the composite image by combining the captured image with the generated virtual image.

12. A head mounted image-sensing display device comprising:
image-sensing units configured to capture a physical space and outputting a captured image;
a storage unit configured to store image-sensing parameters, which are previously measured, for generating a virtual image that is to be combined with the captured image and which include at least one of a convergence angle of the image-sensing units and a base line of the image-sensing units; and
a display unit configured to display the virtual image with the captured image, the virtual image is generated so that the virtual image can be correctly arranged in the captured image based on the image-sensing parameters.

13. A system comprising:
a head mount display having imaging units which sense a real image and a display unit which displays a virtual image, wherein the real image is an image of a physical space; and
an image processing apparatus which generates the virtual image to be displayed on the display unit,
wherein the head mount display further comprises a storage unit configured to store previously measured image-sensing parameters for generating the virtual image and with include at least one of a convergence angle of the imaging units and a base line of the imaging units, and
wherein the image processing apparatus further comprises:
an obtaining unit configured to obtain the real image and the image-sensing parameters when the imaging units captures the real image;
a generation unit configured to generate the virtual image based on the image-sensing parameters and three-dimensional model information so that the virtual image can be correctly arranged with the real image.

14. A method of using a head mounted image-sensing display device comprising:
capturing an image of a physical space with a plurality of image-sensing units of the mounted image-sensing display device and outputting a captured image;
storing image-sensing parameters, which are previously measured, including at least one of a convergence angle of the image-sensing units and a base line between the image-sensing units, for generating a virtual image to be combined with the captured image; and
generating a the virtual image so that the virtual image can be correctly arranged with the captured image, based on the image-sensing parameters;
generating a composite image by combining the captured image with the virtual image; and
displaying the composite image in the head mounted image-sensing display device.

15. A method comprising:
obtaining a captured image of a physical space, from image-sensing units, and image-sensing parameters, which are previously measured for generating a virtual image and which include at least one of a convergence angle of image-sensing units and a base line between the image-sensing units, when the image-sensing units capture the captured image;
generating the virtual image based on the image-sensing parameters and three-dimensional model information, so that the virtual image can be correctly arranged with the captured image; and
displaying the virtual image with the captured image.

16. A method comprising:
sensing a real image with imaging units a head mount display, wherein the real image is an image of a physical space;
storing image-sensing parameters, which are previously measured, for generating the virtual object to be combined with the real image and which include at least one of a convergence angle of the imaging units and a base line of the imaging units;

generating the virtual image based on the image-sensing parameters and three-dimensional model information, so that the virtual image can be correctly arranged with the real image;

generating a composite image to be displayed in a display unit of the head mount display, by combining the real image with a virtual image;

displaying the composite image in the head mount display.

17. A method of using a head mounted image-sensing display device comprising:

capturing an image of a physical space with image-sensing units and outputting a captured image;

storing image-sensing parameters, which are previously measured for generating a virtual image that is to be combined with the captured image and which include at least one of a convergence angle of the image-sensing units and a base line of the image-sensing units; and displaying the virtual image with the image of the physical space, wherein the virtual image is generated so that the virtual image can be correctly arranged with the captured image based on the image-sensing parameters.

18. A method comprising:

sensing a real image with imaging units of a head mount display, wherein the real image is an image of a physical space;

storing image-sensing parameters, which are previously measured, for generating a virtual image and which include at least one of a convergence angle of the imaging units and a base line of the imaging units;

obtaining the real image and the image-sensing parameters in a image processing apparatus when the imaging units capture the real image;

generating the virtual image in the image processing apparatus based on three-dimensional model information and the image-sensing parameters, so that the virtual image can be correctly arranged with the real image; and displaying the virtual image with the real image in a display unit of the head mount display.

* * * * *